(12) United States Patent
Hamano et al.

(10) Patent No.: US 6,494,968 B1
(45) Date of Patent: Dec. 17, 2002

(54) LAMELLAR RARE EARTH-IRON-BORON-BASED MAGNET ALLOY PARTICLES, PROCESS FOR PRODUCING THE SAME AND BONDED MAGNET PRODUCED THEREFROM

(75) Inventors: Masaaki Hamano, Hiroshima (JP); Minoru Yamasaki, Hatsukaichi (JP); Hirotaka Mizuguchi, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/241,423

(22) Filed: Feb. 2, 1999

(30) Foreign Application Priority Data

Feb. 6, 1998 (JP) .......................... 10-041074

(51) Int. Cl.$^7$ ............................. H01F 1/057
(52) U.S. Cl. ................ 148/302; 252/62.54; 75/355; 148/101
(58) Field of Search ................ 148/302, 101; 75/255, 355; 252/62.59, 62.54

(56) References Cited

U.S. PATENT DOCUMENTS 4,983,232 A * 1/1991 Endoh et al. ............... 148/302
5,022,939 A 6/1991 Yajima et al. ............. 148/302
5,125,990 A * 6/1992 Iwasaki et al. ............ 148/302

FOREIGN PATENT DOCUMENTS

| EP | 0195219 A2 | 9/1986 |
| EP | 0229946 A1 | 7/1987 |
| JP | 01194305 | 8/1989 |
| JP | 01300503 | 12/1989 |

* cited by examiner

Primary Examiner—John Sheehan
(74) Attorney, Agent, or Firm—Nixon & Vanderhye P.C.

(57) ABSTRACT

Lamellar rare earth-iron-boron-based magnet alloy particles for a bonded magnet, having an intrinsic coercive force (iHc) of not less than 3.5 kOe, a residual magnetic flux density (Br) of not less than 9.5 kG, and a maximum energy product ($(BH)_{max}$) of not less than 13 MGOe. These particles have an average major axial diameter of 60 to 500 μm, an average minor axial diameter of 50 to 460 μm, an average axis ratio (major axial diameter/minor axial diameter) of 1.1 to 10 and an average aspect ratio (major axial diameter/thickness) of 3 to 100. The magnet alloy particles have a residual magnetic flux density (Br) as high as not less than 10 kG, an intrinsic coercive force (iHc) as large as not less than 3.5 kOe and a maximum energy product ($(BH)_{max}$) as large as not less than 13 MGOe, are used as a material for high-performance bonded magnets.

9 Claims, 4 Drawing Sheets

LAMELLAR RARE EARTH-IRON-BORON-BASED MAGNET ALLOY PARTICLES, PROCESS FOR PRODUCING THE SAME AND BONDED MAGNET PRODUCED THEREFROM

BACKGROUND OF THE INVENTION

The present invention relates to lamellar rare earth-iron-boron-based magnet alloy particles, a process for producing the rare earth-iron-boron-based magnetic alloy particles and a bonded magnet produced from such rare earth-iron-boron-based magnet alloy particles, and more particularly, to lamellar rare earth-iron-boron-based magnet alloy particles which have a residual magnetic flux density (Br) as high as not less than 10 kG, an intrinsic coercive force (iHc) as large as not less than 3.5 kOe and a maximum energy product $((BH)_{max})$ as large as not less than 13 MGOe, and which are excellent in rust preventability and leafing effect, a process for producing the lamellar rare earth-iron-boron-based magnet alloy particles, and a bonded magnet produced from such lamellar rare earth-iron-boron-based magnet alloy particles.

Bonded magnets which are advantageous in that they can be produced in any shape and have a high dimensional accuracy, etc., have conventionally been used in various fields such as electric appliances and automobile parts. With a recent development of miniaturized and light-weight electric appliances and automobile parts, bonded magnets used therefor have been strongly required to be miniaturized.

For this purpose, magnets have been strongly required to show a high magnet performance, i.e., a high residual magnetic flux density (Br), a large intrinsic coercive force (iHc) and a large maximum energy product $((BH)_{max})$.

As is well known in the arts, a bonded magnet comprising magneto plumbite type ferrite such as barium ferrite or strontium ferrite (referred to as 'ferrite bonded magnet' hereinunder) and a binder resin has an excellent rust preventability because ferrite particles are an oxide. In addition, since the ferrite bonded magnets are produced from a cheap material such as oxides of barium and strontium and iron oxide, the ferrite bonded magnets are economical and are, therefore, widely used.

As to the magnetic characteristics of these ferrite bonded magnets, however, the residual magnetic flux density (Br) is about 2 to 3 kG, the intrinsic coercive force (iHc) is about 2 to 3 kOe, and the maximum energy product ((BH)max) is about 1.6 to 2.3 MGOe. Therefore, these bonded magnets are insufficient to accomplish the miniaturization and weight-reduction of apparatuses or equipments in which the bonded magnets are incorporated.

On the other hand, there is no end to a demand for a higher performance and a lower price of a magnet. Since Nd-iron-boron-based magnet alloys using Nd which is relatively low in price among rare earth elements, have been almost simultaneously developed in 1982 by Sumitomo Tokushu Kinzoku Co., Ltd. (Japan) and General Motors Corp. (USA), the magnet alloys have been used in extensive application fields, and it has also been attempted to apply the magnet alloy to the production of bonded magnets. To further improve the magnetic characteristics, rare earth-iron-boron-based alloys for exchange-spring magnets have been earnestly developed and some of them have already been put to practical use.

An exchange-spring magnet exhibits a magnetic spring phenomenon by the exchange interaction of iron ($\alpha$Fe) or an iron compound and an $Nd_2Fe_{14}B_1$ type tetragonal compound. Those magnets are characterized in a low rare earth element content and a high residual magnetic flux density (Br), and have a high possibility of being excellent on a cost/performance basis.

A rare earth-iron-boron-based alloy for exchange-spring magnets containing less than 10 atm % of a rare earth element such as Nd, has a high potential in magnetic characteristics as compared with a rare earth-iron-boron-based magnet alloy containing about 10 to 15 atm % of a rare earth element such as Nd which is in the vicinity of the stoichiometeric composition, e.g., commercially available "MQP" (trade name) developed by General Motors. Since it is possible to reduce the amount of expensive rare earth element used, this alloy is economically advantageous.

The rare earth-iron-boron-based alloy for exchange-spring magnets containing less than 10 atm % of a rare earth element such as Nd has a system containing $\alpha$Fe or a system containing $Fe_3B$ or $Fe_2B$ as the soft magnetic phase. The system containing $\alpha$Fe as the soft magnetic phase generally has a residual magnetic flux density (Br) as high as 10 to 13 kG, but the intrinsic coercive force (iHc) thereof is as low as less than 3.5 kOe at most. The system containing $Fe_3B$ or $Fe_2B$ as the soft magnetic phase generally has a comparatively high intrinsic coercive force (iHc) such as 3.5 to 7.7 kOe, but the residual magnetic flux density (Br) thereof is as low as less than 10 kG, and as a result, the bonded magnet produced from the system containing $Fe_3B$ or $Fe_2B$ as the soft magnetic phase has a higher residual magnetic flux density (Br) than that of "MQP", but lower residual magnetic flux density (Br) than that composed of the system containing $\alpha$Fe as the soft magnetic phase.

In the field of small-sized motors for which bonded magnets produced from a rare earth-iron-boron-based magnet alloy is mainly used, bonded magnets are required to have well-balanced residual magnetic flux density (Br) and, intrinsic coercive force (iHc) from the point of view of miniaturization of motors and magnetic stability of the magnets used therefor. That is, bonded magnets are strongly required to have a residual magnetic flux density (Br) of not less than 10 kG and an intrinsic coercive force (iHc) of not less than 3.5 kOe.

On the other hand, a magnet alloy containing rare earth elements such as Nd is defective in that it is easily oxidized in the air and is likely to produce an oxide, so that the rust preventability is poor. Therefore, since bonded magnets produced from a magnet alloy containing a rare earth element such as Nd have a poor corrosion resistance, the bonded magnets are usually subjected to rust preventive coating-treatment such as dipping, spread coating or electro deposition using a resin and metal plating.

If the rust preventability of a magnet alloy containing a rare earth element such as Nd is enhanced, it may be possible to simplify or omit the rust preventive coating-treatment for the surfaces of bonded magnets even for the above-described use. In some uses, there is a possibility of omitting the rust preventive coating-treatment. Therefore, the enhancement of the rust preventability of a rare earth-iron-boron-based magnet alloy is strongly demanded.

The bonded magnets have also been produced usually by kneading magnet particles in a binder resin and forming the kneaded material into an appropriate shape. In this case, it is known that flake-like magnet particles are readily mechanically oriented, so that it is possible to enhance the packing density of these particles in the binder resin. However, in the case where the flake-like particles have curved surfaces, it becomes difficult to sufficiently enhance the packing density.

In Japanese Patent Application Laid-open (KOKAI) No. 2-34706(1990), though the invention thereof relates to different application field from that of the present invention, it is described that " . . . In general, as particles for paints, flake-like particles are preferred. That is, when such flake-like particles are mixed in a resin and the resultant paint is applied by a brush coating method or a spray coating method, these particles are deposited in parallel with the coating surface due to surface tension caused upon curing of the resin (called "leafing effect or phenomenon"), so that a continuous coating film composed of the particles is formed, thereby preventing the base material from coming into contact with outside air, and imparting a good corrosion resistance and weather resistance thereto . . . ". Similarly, in the production of bonded magnets, when lamellar magnet alloy particles having no curved surfaces are used, the packing density of these particles in bonded magnets can be readily enhanced by the leafing effect thereof, whereby the residual magnetic flux density (Br) of the bonded magnet and as a result, the maximum energy product ($(BH)_{max}$) thereof can be enhanced.

In consequence, it has been demanded to provide lamellar rare earth magnet alloy particles having no curved surfaces and exhibiting an excellent leafing effect.

More specifically, there has been a strong demand for lamellar rare earth-iron-boron-based magnet alloy particles which have a high residual magnetic flux density (Br), a large intrinsic coercive force (iHc) and a large maximum energy product ($(BH)_{max}$), and are excellent in rust preventability and leafing effect.

In conventional quenched permanent magnet materials which contain Fe as the main ingredient (less than 91 atm %) and further contain at least one rare earth element (R) and boron (B), there is known a permanent magnet material which comprises less than 10 area % of a soft magnetic amorphous phase based on the total alloy structure and a crystalline phase as the balance which contains an R—Fe—B type hard magnetic compound (Japanese Patent Application Laid-Open (KOKAI) No. 8-162312 (1996)).

Although the production of rare earth-iron-boron-based magnet alloy particles which have a high residual magnetic flux density (Br), a large intrinsic coercive force (iHc) and a large maximum energy product ((BH)max), and are excellent in rust preventability and leafing effect, is now in the strongest demand, no rare earth-iron-boron-based magnet alloy particles having such properties are provided.

In the rare earth-iron-boron-based magnet alloy described in Japanese Patent Application Laid-Open (KOKAI) No. 8-162312 (1996)), the intrinsic coercive force (iHc) is as low as less than 3 kOe and the residual magnetic flux density (Br) is as low as less than 10 kG, as is clear from Table 5 in the specification in which the residual magnetic flux density (Br) is about 0.62 to 0.97 T (equivaleht to 6.2 to 9.7 kG), the intrinsic coercive force (iHc) is about 0.16 to 0.21 MA/m (equivalent to 1.25 to 2.6 kOe), and the maximum energy product ($(BH)_{max}$) is about 19.7 to 72.0 kJ/m$^3$ (equivalent to 2.5 to 9.0 MGOe).

The rare earth-iron-boron-based magnet alloys described in Examples 2 to 4 of Japanese Patent Application Laid-Open (KOKAI) No. 8-162312 (1996) are bulk bodies obtained by pulverizing a quenched ribbon and extruding the pulverized particles under a vacuum. The bulk bodies are, therefore, different in configuration from those of lamellar rare earth-iron-boron-based magnet alloy particles.

Accordingly, at present, it has been strongly demanded to provide lamellar rare earth-iron-boron-based magnet alloy particles which have a high residual magnetic flux density (Br), a comparatively large intrinsic coercive force (iHc) and a large maximum energy product ($(BH)_{max}$), and are excellent in rust preventability and leafing effect for production of a bonded magnet.

As a result of the present inventors' earnest studies, it has been found that by producing a mixture having a composition represented by the following formula:

wherein R is at least one rare earth element selected from the group consisting of Nd, Pr, Dy, Tb and Ce, M is at least one element selected from the group consisting of Ti, V, Cr, Zr, Nb, Mo, Hf, Ta, W, Mn, Cu, Ga, Ag and Si, x is 5 to 10, y is 1.0 to 9.0, z is 0.1 to 5, w is 2 to 7, (x+w): is not less than 9 and (y+z) is more than 5;

melting the obtained mixture under heating to,produce a molten alloy;

discharging the molten alloy through a nozzle;

spraying a gas onto the molten alloy discharged to form droplets of the molten alloy;

before solidification of the droplets thereof, causing the droplets to collide against a rotary cooling member disposed along the falling direction of the droplets to subject the droplets to quench solidification, thereby forming quenched and solidified particles; and heat-treating the quenched and solidified particles in the temperature range of 600 to 850° C., the obtained lamellar (including flat leaf-shaped and ellipse plate-shaped) rare earth-iron-boron-based magnet alloy particles have an average major axial diameter of 50 to 500 μm, an average minor axial diameter of 50 to 500 μm, an average axis ratio (major axial diameter/minor axial diameter) of 1 to 10 and an average aspect ratio (major axial diameter/thickness) of 5 to 100, exhibit a residual magnetic flux density (Br) as high as not less than 10 kG, an intrinsic coercive force (iHc) as large as not less than 3.5 kOe and a maximum energy product ($(BH)_{max}$) as large as not less than 13 MGOe, are excellent in rust preventability and leafing effect, and are suitable for the production of bonded magnet.

The present invention has been attained on the basis of the finding.

SUMMARY OF THE INVENTION

It is an object of the present invention to provide lamellar rare earth-iron-boron-based magnet alloy particles for a bonded magnet, which have a high residual magnetic flux density (Br), a large intrinsic coercive force (iHc) and a large maximum energy product ($(BH)_{max}$), and show an excellent rust preventability and an excellent leafing effect.

It is another object of the present invention to provide a process for producing lamellar rare earth-iron-boron-based magnet alloy particles with a high efficiency without a pulverizing step.

It is a further object of the present invention to provide a bonded magnet which has a high saturation magnetic flux density (Br) and a large maximum energy product ($(BH)_{max}$), and shows an excellent rust preventability.

To accomplish the aims, in a first aspect of the present invention, there are provided lamellar rare earth-iron-boron-based magnet alloy particles for a bonded magnet, having an intrinsic coercive force (iHc) of not less than 3.5 kOe, a residual magnetic flux density (Br) of not less than 9.5 kG, and a maximum energy product ($(BH)_{max}$) of not less than 13 MGOe, and having an average major axial diameter of 60 to 500 μm, an average minor axial diameter of 50 to 460 μm, an average axis ratio (major axial diameter/minor axial diameter) of 1.1 to 10 and an average aspect ratio (major axial diameter/thickness) of 3 to 100.

In a second aspect of the present invention, there are provided lamellar rare earth-iron-boron-based magnet alloy particles for a bonded magnet, having an intrinsic coercive force (iHc) of not less than 3.5 kOe, a residual magnetic flux density (Br) of not less than 9.5 kG, and a maximum energy product ((BH)$_{max}$) of not less than 13 MGOe, having an average major axial diameter of 60 to 500 μm, an average minor axial diameter of 50 to 460 μm, an average axis ratio (major axial diameter/minor axial: diameter) of 1.1 to 10 and an average aspect ratio (major axial diameter/thickness) of 3 to 100, and having a composition represented by the formula:

$$R_xFe_{(100-x-y-z-w)}Co_yM_zB_w$$

wherein R is at least one rare earth element selected from the group consisting of Nd, Pr, Dy, Tb and Ce, M is at least one element selected from the group consisting of Ti, V, Cr, Zr, Nb, Mo, Hf, Ta, W, Mn, Cu, Ga, Ag and Si, x is 5 to 10, y is 1.0 to 9.0, z is 0.1 to 5, w is 2 to 7, (x+w) is not less than 9, and (y+z) is more than 5.

In a third aspect of the present invention, there is a process for producing lamellar rare earth-iron-boron-based magnet alloy particles for a bonded magnet, comprising the steps of:

preparing a mixture having a composition of the rare earth-iron-boron-based magnet alloy particles;

heat-melting said obtained mixture to produce a molten alloy;

discharging said molten alloy through a nozzle;

spraying a gas onto said molten alloy discharged to form droplets of said molten alloy;

before solidification of said droplets, causing said droplets to collide against a cone-shaped or disc-shaped rotary cooling member which is disposed along the falling direction of said droplets to subject said droplets to quench solidification and is rotated, thereby forming quenched and solidified particles; and heat-treating said quenched and solidified particles in the temperature range of 600 to 850° C.

In a fourth aspect of the present invention, there is provided a bonded magnet comprising:

85 to 99% by weight of the lamellar rare earth-iron-boron-based magnet alloy particles for a bonded magnet, having an intrinsic coercive force (iHc) of not less than 3.5 kOe, a residual magnetic flux density (Br) of not less than 9.5 kG, and a maximum energy product ((BH)$_{max}$) of not less than 13 MGOe, and having an average major axial diameter of 60 to 500 μm, an average minor axial diameter of 50 to 460 μm, an average axis ratio (major axial diameter/minor axial diameter) of 1.1 to 10 and an average aspect ratio (major axial diameter/thickness) of 3 to 100; and a binder resin in which said lamellar rare earth-iron-boron-based magnet alloy particles are dispersed.

In a fifth aspect of the present invention, there is provided a bonded magnet comprising:

85 to 99% by weight of lamellar rare earth-iron-boron-based magnet alloy particles for a bonded magnet, having an intrinsic coercive force (iHc) of not less than 3.5 kOe, a residual magnetic flux density (Br) of not less than 9.5 kG, and a maximum energy product ((BH)$_{max}$) of not less than 13 MGOe, having an average major axial diameter of 60 to 500 μm, an average minor axial diameter of 50 to 460 μm, an average axis ratio (major axial diameter/minor axial diameter) of 1.1 to 10 and an average aspect ratio (major axial diameter/thickness) of 3 to 100, and having a composition represented by the formula:

$$R_xFe_{(100-x-y-z-w)}Co_yM_zB_w$$

wherein R is at least one rare earth element selected from the group consisting of Nd, Pr, Dy, Tb and Ce, M is at least one element selected from the group consisting of Ti, V, Cr, Zr, Nb, Mo, Hf, Ta, W, Mn, Cu, Ga, Ag and Si, x is 5 to 10, y is 1.0 to 9.0, z is 0.1 to 5, w is 2 to 7, (x+w) is not less than 9, and (y+z) is more than 5; and a binder resin in which said lamellar rare earth-iron-boron-based magnet alloy particles are dispersed.

DETAILED DESCRIPTION OF THE INVENTION

The present invention is described in detail below.

First, lamellar rare earth-iron-boron-based magnet alloy particles for bonded magnet according to the present invention are explained.

The rare earth-iron-boron-based magnet alloy particles for bonded magnet according to the present invention, are of a lamellar shape including a flat shape and ellipse plate shape, and have an average major axial diameter of 60 to 500 μm, an average minor axial diameter of 50 to 460 μm, an average axis ratio (major axial diameter/minor axial diameter) of 1.1 to 10 and an average aspect ratio (major axial diameter/thickness) of 5 to 100.

The average major axial diameter of the lamellar rare earth-iron-boron-based magnet alloy particles according to the present invention, is preferably 80 to 500 μm, more preferably 100 to 500 μm. The average minor axial diameter thereof is preferably 70 to 460 μm, more preferably 85 to 460 μm. The average thickness thereof is preferably 3 to 100 μm, more preferably 5 to 95 μm. The average axis ratio (major axial diameter/minor axial diameter) thereof is preferably 1.1 to 5, more preferably 1.1 to 3. The average aspect ratio (major axial diameter/thickness) thereof is preferably 3 to 50, more preferably 3 to 30.

The alloy structure of the lamellar rare earth-iron-boron-based magnet alloy particles for bonded magnet according to the present invention, is described below.

The lamellar rare earth-iron-boron-based magnet alloy particles for bonded magnet according to the present invention, have an alloy composition represented by the formula:

$$R_xFe_{(100-x-y-z-w)}Co_yM_zB_w.$$

The R in the above formula is at least one rare earth element selected from the group consisting of Nd, Pr, Dy, Tb and Ce. Under the consideration of the residual magnetic flux density (Br) and the intrinsic coercive force (iHc), Nd, Pr, an Nd—Pr alloy are preferable. Nd and Pr are more preferable. At least other rare earth element (Sc, Y, La, Pm, Sm, Eu, Gd, Ho, Er, Tm, Yb and Lu) may be added to Nd, Pr or an Nd—Pr alloy. The amount of the other rare earth elements is preferably not more than 10 atm % based on the atom of the total rare earth elements.

The amount of R which is represented by x, is in the range of 5 to 10 atm %, preferably 5.5 to 9 atm %, more preferably 6 to 8 atm % based on the atom of the alloy composition of lamellar rare earth-iron-boron-based magnet alloy particles. When x is less than 5 atm %, the amount of the crystallized hard magnetic crystalline phase constituted of $Nd_2Fe_{14}B_1$ type tetragonal crystals is insufficient, so that an intrinsic coercive force of not less than 3.5 kOe is not obtained. When x exceeds 10 atm %, the amount of crystallized soft magnetic crystalline phase constituted of $\alpha Fe$, a solid solution composed of $\alpha Fe$ and M, or a mixed phase composed of $\alpha Fe$ and the solid solution, is insufficient, so that a residual magnetic flux density (Br) as high as not less than 10 kG is not obtained.

The amount of Fe which is represented by 100-x-y-z-w, is in the range of 69 to 86 atm % based on the atom of the alloy composition of lamellar rare earth-iron-boron-based magnet alloy particles. When the amount of Fe is less than 69 atm %, the residual magnetic flux density (Br) is lowered and it is difficult to obtain a residual magnetic flux density of not less than 10 kG, which is aimed at in the present invention. When the amount of Fe exceeds 86 atm %, the amounts of R and Co are relatively reduced, so that it is difficult to obtain an intrinsic coercive force of not less than 3.5 kOe, which is aimed at in the present invention.

Co as well as M is an essential element because it enhances the intrinsic coercive force, increases the magnetization, improves the corrosion resistance and/or raises the Curie point.

The amount of Co which is represented by y, is in the range of 1.0 to 9.0 atm %, preferably 1.5 to 9.0 atm %, more preferably 2.0 to 9.0 atm % based on the atom of the alloy composition of lamellar rare earth-iron-boron-based magnet alloy particles. When the amount of Co is less than 1.0 atm %, the increase in the intrinsic coercive force and the Curie point are sometimes insufficient, so that the thermal stability becomes inferior. When the amount of Co exceeds 9.0 atm %, the lowering of the residual magnetic flux density (Br) due to a shortage of an iron component is sometimes remarkable, so that it is difficult to obtain a residual magnetic flux density of not less than 10 kG.

The M is at least one element selected from the group consisting of Ti, V, Cr, Zr, Nb, Mo, Hf, Ta, W, Mn, Cu, Ga, Ag and Si. M is able to enhance the crystalline magnetic anisotropy of the hard magnetic crystalline phase constituted of $Nd_2Fe_{14}B_1$ type tetragonal crystals and to produce a high intrinsic coercive force due to the effect of making the grain of the crystallized phase finer. The M is also able to stabilize the soft magnetic crystalline phase constituted of $\alpha Fe$, a solid solution composed of $\alpha Fe$ and M, or a mixed phase composed of $\alpha Fe$ and the solid solution, and to improve the corrosion resistance and the thermal stability of the bonded magnet produced therefrom.

By the synergism of the coexistence of at least one element selected from the group consisting of Mn, Cu, Ga, Ag and Si, and other M element(s), larger intrinsic coercive force can be obtained.

The amount of M which is represented by z, is in the range of 0.1 to 5 atm %, preferably 0.2 to 4 atm %, more preferably 0.3 to 3.5 atm % based on the atom of the alloy composition of lamellar rare earth-iron-boron-based magnet alloy particles. When the amount of M is less than :0.1 atm %, the effect of enhancing the intrinsic coercive force is poor and the thermal stability is lowered. When the amount of M exceeds 5 atm %, the residual magnetic flux density (Br) is lowered due to a shortage of an iron and/or cobalt components.

Ti, Zr, Nb, Hf, Ta, Si and Ga among the above-mentioned M elements can contribute to the enhancement of the intrinsic coercive force and are likely to form an amorphous phase, so that the amorphous phase stably remains in the alloy structure, whereby it is possible to produce magnet alloy particles having an excellent rust preventability. Further, by using the magnet alloy particles, there can be obtained bonded magnets having an excellent corrosion resistance.

B is an essential element to form the hard magnetic crystalline phase constituted of $Nd_2Fe_{14}B_1$ type tetragonal crystals. The amount of B which is represented by w, is in the range of 2 to 7 atm %, preferably 2.5 to 6.5 atm %, more preferably 3 to 6.5 atm % based on the atom of the alloy composition of lamellar rare earth-iron-boron-based magnet alloy particles. When the amount of B is less than 2 atm %, the amount of crystallized hard magnetic crystalline phase constituted of $Nd_2Fe_{14}B_1$ type tetragonal crystals is sometimes insufficient, so that an intrinsic coercive force (iHc) of not less than 3.5 kOe is not obtained. When the amount of B exceeds 7 atm %, B is excessive, which leads to the lowering of the residual magnetic flux density (Br).

The total amount (x+w) of R and B is not less than 9 atm %, preferably not less than 10 atm % based on the atom of the alloy composition of lamellar rare earth-iron-boron-based magnet alloy particles. When the total amount of R and B is less than 9 atm %, an adequate soft magnetic amorphous phase is not produced by quenching, so that it is impossible to obtain an intrinsic coercive force (iHc) of not less than 3.5 kOe even by heat-treatment. In order to retain a high residual magnetic flux density, the upper limit of the total amount of R and B is preferably 18 atm %, more preferably 17 atm % based on the atom of the alloy composition of lamellar rare earth-iron-boron-based magnet alloy particles.

The total amount (y+z) of Co and M is more than 5 atm %, preferably not less than 5.1 atm %, more preferably not less than 5.5 atm % based on the atom of the alloy composition of lamellar rare earth-iron-boron-based magnet alloy particles. When the total amount of Co and M is not more than 5 atm %, it is difficult to produce the effect of enhancing the intrinsic coercive force and the thermal stability. In order to retain a high residual magnetic flux density, the upper limit of the total amount of Co and M is preferably 11 atm %, more preferably 10 atm % based on the atom of the alloy composition of lamellar rare earth-iron-boron-based magnet alloy particles.

The alloy structure of the lamellar rare earth-iron-boron-based magnet alloy particles for bonded magnet according to the present invention will now be described.

The lamellar rare earth-iron-boron-based magnet alloy particles for bonded magnet according to the present invention contains a soft magnetic amorphous phase, in an amount of not more than 10 area %, preferably not more than 9 area % based on the area of the total alloy structure.

When the ratio of the soft magnetic amorphous phase exceeds 10 area % based on the total alloy structure in a two-dimensional observation field, the distance at which the magnetic exchange interaction between the soft magnetic crystalline phase and the hard magnetic crystalline phase may be caused, is enlarged, so that a magnetic bonding force due to the magnetic interaction therebetween may be weakened and it is difficult to produce the effect of enhancing the magnetic characteristics. In order to produce the rust preventability by the soft magnetic amorphous phase, the lower limit of the ratio of the soft magnetic amorphous phase is preferably 1 area % based on the area of the total alloy structure.

The soft magnetic amorphous phase comprises 8 to 20 atm %, preferably 9 to 15 atm % of rare earth elements based on the atom of the soft magnetic amorphous phase; 70 to 90 atm %, preferably 70 to 85 atm % of iron or an alloy of iron and the above-mentioned element M based on the atom of the soft magnetic amorphous phase; and not more than 22 atm %, preferably 5 to 18 atm % of boron based on the atom of the soft magnetic amorphous phase. The soft magnetic amorphous phase has not only a soft magnetism but also has an important role to enhance the hard magnetism of the alloy as a whole by suppressing the coarse growth of crystal grains and forming a fine crystal phase in the heat-treatment step for crystallization.

In addition, since the soft magnetic crystalline phase and the hard magnetic crystalline phase are dispersed and crystallized in the form of islands within the soft magnetic amorphous phase, i.e., since the soft magnetic amorphous phase surrounds the soft magnetic crystalline phase and the hard magnetic crystalline phase which act mainly as magnetic parts, these crystalline phases can be prevented from being oxidized. Thus, the soft magnetic amorphous phase can act as a barrier for preventing the proceeding of corrosion of these crystalline phases, thereby improving the rust preventability of the magnet alloy particles.

Further, effects of imparting a mechanical strength, chemical resistance, rust preventability, etc. which are usually exhibited by an amorphous phase, can also be expected by the soft magnetic amorphous phase.

The soft magnetic crystalline phase of the lamellar rare earth-iron-boron-based magnet alloy particles according to the present invention, comprises αFe, a solid solution composed of αFe and M, or a mixed phase composed of αFe and the solid solution, and occupies not less than 10 area %, preferably 10 to 90 area %, more preferably 15 to 80 area % based on the area of the total crystalline structure. The soft magnetic crystalline phase contributes to the enhancement of the residual magnetic flux density (Br). When the ratio of the soft magnetic crystalline phase is less than 10 area %, it is difficult to produce the aimed magnet alloy particles having a high residual magnetic flux density (Br). In the consideration of the ratio of the hard magnetic crystalline phase which has a role of enhancing the intrinsic coercive force (iHc), the upper limit of the ratio of the soft magnetic crystalline phase is preferably 90 area % based on the area of the total crystalline structure.

The average diameter of crystal grains in the soft magnetic crystalline phase is preferably 5 to 100 nm, more preferably 10 to 50 nm.

The soft magnetic crystalline phase may sometimes contain $Fe_3B$, $Fe_2B$, a solid solution composed of $Fe_3B$ or $Fe_2B$ and M, an intermetallic compound of Fe and M such as $Fe_2Zr$ in addition to αFe, the solid solution composed of αFe and M, or the mixed phase composed of αFe and the solid solution in a constitution phase diagram or inevitably in the production process, but there is no particular problem in the production of magnet alloy particles having various properties intended by the present invention.

The hard magnetic crystalline phase of the lamellar rare earth-iron-boron-based magnet alloy particles according to the present invention is composed of $Nd_2Fe_{14}B_1$ type tetragonal crystals and occupies less than 90 area % based on the area of the total crystalline structure.

When the content of the hard magnetic crystalline phase exceeds 90 area %, the soft magnetic crystalline phase reduces, so that it is difficult to produce a high residual magnetic flux density (Br). The content of the hard magnetic crystalline phase is preferably 10 to 90 area %, more preferably 20 to 85 area % based on the area of the total crystalline structure with the consideration of the intrinsic coercive force (iHc) intended by the present invention.

The hard magnetic crystalline phase has an effect of producing a large intrinsic coercive force (iHc). A part of M sometimes enters into the hard magnetic crystalline phase and enhances the anisotropic constant, resulting in: increasing the intrinsic coercive force.

The hard magnetic crystalline phase may contain, in addition to an $Nd_2Fe_{14}B_1$ compound, a fine grain compound phase which is inevitably crystallized in a constitutional phase diagram.

The average diameter of crystal grains in the hard magnetic crystalline phase is preferably 5 to 100 nm, more preferably 10 to 50 nm.

In the lamellar rare earth-iron-boron-based magnet alloy particles for bonded magnet according to the present invention, the residual magnetic flux density (Br) is usually not less than 9.5 kG, preferably not less than 10 kG, the intrinsic coercive force (iHc) is usually not less than 3.5 kOe, preferably no less than 4.0 kOe, and the maximum energy product $((BH)_{max})$ is usually not less than 13 MGOe, preferably not less than 15 MGOe. The residual magnetic flux density (Br) of 13 kG can be exhibited as a maximum value thereof. The intrinsic coercive force (iHc) of 8 kOe can be exhibited as a maximum value thereof. The maximum energy product $((BH)_{max})$ of 25 MGOe can be exhibited as a maximum value thereof.

Incidentally, among the above-mentioned magnetic properties of the magnet alloy particles, the residual magnetic flux density (Br) is a calculated value obtained by measuring a residual magnetic flux density (Br) of a green compact thereof and appropriately compensating the measured values. The maximum energy product $((BH)_{max})$ is also obtained by using the residual magnetic flux density (Br) calculated of the green compact.

The rust preventability of the lamellar rare earth-iron-boron-based magnet alloy particles for bonded magnet according to the present invention, which is represented by the passage of time until the rust generated occupies 10 area % based on the area of the total surface of magnet alloy particles, with the measurement by a salt spray test according to JIS Z 2371, is usually not less than 50 hours, preferably not less than 55 hours, more preferably not less than 60 hours. This is distinctly more excellent than the rust preventability of a conventional Nd—Fe—B-based alloy particles.

The process for producing the lamellar rare earth-iron-boron-based magnet alloy particles for bonded magnet according to the present invention will now be described.

A raw alloy is produced by preparing a mixture of metal element materials and/or alloy materials such that the mixture has a composition represented by the formula:

$$R_xFe_{(100-x-y-z-w)}Co_yM_zB_w$$

wherein R is at least one rare earth element selected from the group consisting of Nd, Pr, Dy, Tb and Ce, M is at least one element selected from the group consisting of Ti, V, Cr, Zr, Nb, Mo, Hf, Ta, W, Mn, Cu, Ga and Si, x is 5 to 10 (atm %), y is 1.0 to 9.0 (atm %), z is 0.1 to 5 (atm %), w is 2 to 7 (atm %), (x+w) is not less than 9 (atm %) and (y+z) is more than 5 (atm %); and heat-melting the obtained mixture to form a molten alloy, followed by cooling and solidifying the molten alloy.

As the metal element materials, commercially available ones are usable in any form such as particles, bulk, piece and plate.

As the alloy materials, commercially available ones may also be used. For example, there are ferroboron as boron, and ferroneodium, Mish metal and didymium as rare earth elements. These may be used in any shape such as particles, bulk, piece and plate.

The heat-melting may be conducted by known arc melting method, high-frequency melting method or the like. The heat-melting is preferably conducted under a vacuum or in an inert atmosphere such as argon gas.

The thus obtained raw alloy is heat-melted so as to obtain a molten alloy. Then, the molten alloy is allowed to discharge through a nozzle, and sprayed with a gas, thereby forming the molten alloy into droplets. Before being solidified, the droplets are caused to collide against the surface of a cone-shaped or disc-shaped rotary cooling member disposed along the falling direction of the droplets, thereby subjecting the droplets to second quench solidification to form lamellar quenched and solidified particles. Then, the lamellar quenched and solidified particles are heat-treated and crystallized, thereby obtaining the lamellar rare earth-iron-boron-based magnet alloy particles for bonded magnet according to the present invention.

The melting temperature is set depending upon the alloy composition. Usually, it is preferable to heat the alloy at a temperature, which is higher by not less than 50° C. than the melting point of the raw alloy.

As the preferred gases sprayed, there may be exemplified inert gases such as helium gas or argon gas. Among these inert gases, argon gas is more preferred. The pressure of the gas sprayed, is usually 5 to 200 kgf/cm², preferably 10 to 100 kgf/cm². When the pressure of the gas sprayed is more than 200 kgf/cm², the cooling velocity may be too high, so that there is a tendency that the droplets are cooled and solidified before the droplets reach and collide against the surface of the rotary cooling member.

The rotary cooling member has a cone or disc shape. The use of the cone-shaped rotary cooling member is preferred because lamellar particles are more readily produced by the collision thereagainst.

The rotational speed of the rotary cooling member is usually 1,000 to 20,000 rpm, preferably 3,000 to 8,000 rpm. When the rotational speed of the rotary cooling member is less than 1,000 rpm, the obtained quenched and solidified particles tend to be overlapped each other, resulting in forming bulk particles. Further, the particles cannot be sufficiently cooled and solidified, so that a sufficient amount of the soft magnetic amorphous phase cannot be produced therein. Furthermore, it is difficult to obtain a sufficient packing density of the magnet alloy particles upon the production of bonded magnets.

Incidentally, when the disc-shaped rotary cooling member is used, it is preferred that the droplets of the molten alloy collide against the rotary cooling member at such portions slightly offset along the circumferential direction from a rotation axis of the disc-shaped rotary cooling member.

In the present invention, the heat-melting of the raw alloy, the first quench solidification, the re-heat-melting under heating and the second quench solidification by the rotary cooling member may be continuously conducted in the same apparatus, if necessary.

Further, it is also possible to conduct the second quench solidification by the rotary cooling member immediately after heat-melting the metal element materials and/or the alloy materials, in the same apparatus, without conducting the first quench solidification.

Incidentally, upon the second quench solidification by the rotary cooling member, since droplets initially produced tends to have a comparatively larger size than those produced later, it is preferred that quenched and solidified particles initially produced are discarded or whole particles obtained are lately subjected to classification, etc., to remove coarse particles therefrom. In the case where the remaining molten alloy is lessened, the size of droplets produced therefrom becomes smaller, and the obtained quenched and solidified particles also become finer. Therefore, it is preferred that such quenched and solidified particles produced immediately before exhaustion of the molten alloy are discarded or whole particles obtained are lately subjected to classification, etc., to remove finer particles therefrom.

The quenched and solidified particles obtained by the second quench solidification by the rotary cooling member, contains mainly an amorphous alloy structure.

The amorphous alloy shows a broad peak in X-ray diffraction pattern and this fact is also confirmed by a halo-pattern of electron diffraction upon observation by a transmission electron microscope (TEM). Whole alloy structure may not sometimes be amorphous and a crystalline phase may be partially contained therein depending upon the alloy compositions, but if there is a certain extent of the amorphous alloy structure enough to attain the object of the present invention, there is no problem.

The amorphous alloy structure shows a soft magnetism. In addition to the soft magnetism, the amorphous alloy structure also have another important role of enhancing a hard magnetism of the alloy as a whole in order to suppress the coarse growth of crystal grains and enable the formation of a fine crystalline phase in the heat-treatment for crystallization.

The heat-treating temperature for crystallizing the quenched and solidified alloy is usually 600 to 850° C. When the temperature is lower than 600° C., the hard magnetic crystalline phase of $Nd_2Fe_{14}B_1$ type tetragonal crystals may not sometimes be adequately crystallized, so that it is difficult to obtain an intrinsic coercive force of not less than 3.5 kOe. When the temperature exceeds 850° C., the coarse growth of the soft magnetic crystalline phase comprising αFe, a solid solution composed of αFe and M, or a mixed phase composed of αFe and the solid solution may become remarkable, and it is difficult to obtain a high intrinsic coercive force. In addition, since the content of the residual soft magnetic amorphous phase is considerably lowered, it is difficult to exhibit an excellent rust preventability. The optimum heat-treating temperature for imparting good magnetic characteristics is appropriately selected in accordance with the composition of the quenched and solidified alloy.

The atmosphere for heat-treatment is not specifically determined so long as it does not impair the magnetic characteristics of the magnet alloy particles obtained, but an inert atmosphere such as Ar gas or a vacuum of not more than $10^{-1}$ Torr is preferable.

The heat-treating time is preferably not less than 10 seconds. When the heat-treating time is less than 10 seconds, there is a tendency that the soft magnetic crystalline phase and the hard magnetic crystalline phase are not sufficiently crystallized. However, the heat-treating time is preferably not more than one hour. When the heat-treating time exceeds one hour, the coarse growth of the soft magnetic crystalline phase is caused. In both the case, there is a tendency that a coercive force of not less than 3.5 kOe is not obtained.

By the heat-treatment, the crystalline phases are produced from the amorphous phase. At this time, it is important to heat the magnet alloy particles so as not to completely crystallize the amorphous phase but to leave not more than 10 area % of the amorphous phase based on the total alloy structure.

In order to leave the amorphous phase, it is necessary to set the heating conditions so that the precipitation and the growth of the crystalline phases are not caused all over the amorphous phase. Since it is possible to stabilize the amorphous phase and to suppress the growth of the crystallized phases by the effect of the element M added, it is also necessary to set an appropriate alloy composition. A flash annealing method or a rapid-heating rapid-cooling method may be adopted for the heat-treatment, but an ordinary heat-treatment may be conducted depending upon the alloy composition.

The content of the residual amorphous phase is preferably 1 to 10 area %, more preferably 1 to 5 area % based on the area of the total alloy structure. When the content is less than 1 area %, the effects intended by the present invention may not be obtained, nor the rust preventability may be expected. When it exceeds 10 area %, a magnetic bonding force due to the magnetic interaction between the amorphous phase and a crystalline phase or between the crystalline phases may sometimes be weakened.

Next, the bonded magnet according to the present invention will now be described.

The bonded magnet according to the present invention comprises 85 to 99% by weight of the lamellar rare-earth-iron-boron type magnet alloy particles dispersed in a binder resin, and the binder resin and other additives as the balance.

The content of the rare earth-iron-boron-based magnet alloy particles in the bonded magnet slightly varies depending upon the molding method used for the production of the bonded magnet, for example, the content of the rare earth-iron-boron-based magnet alloy particles in injection molding is preferably 88 to 93 wt % based on the weight of the bonded magnet; the content thereof in extrusion molding is preferably 85 to 92 wt % based on the weight of the bonded magnet; the content thereof in compression molding is preferably 95 to 99 wt %, more preferably 98 to 99 wt % based on the weight of the bonded magnet; and the content thereof in calender roll molding is preferably 85 to 90 wt % based on the weight of the bonded magnet. The packing density of the bonded magnet according to the present invention is preferably not less than 6.1 g/cm$^3$. The Curie point (°C.) of the bonded magnet according to the present invention is preferably not less than 350° C.

The bonded magnet according to the present invention has a residual magnetic flux density (Br) of usually not less than 6.0 kG, preferably not less than 7.2 kG; an intrinsic coercive force (iHc) of usually not less than 3.5 kOe, preferably not less than 4.0 kOe; and a maximum energy product ($(BH)_{max}$) of usually not less than 9.5 MGOe, preferably not less than 10 MGOe.

The corrosion resistance of the bonded magnet which is represented by the passage of time until the rust generated at 80° C. and a relative humidity of 90% occupies 10 area % based on the area of the total surface of the magnets, is usually not less than 96 hours, preferably not less than 120 hours.

The process for producing the bonded magnet according to the present invention will now be described.

The bonded magnet according to the present invention can be produced by mixing and kneading the lamellar rare earth-iron-boron-based magnet alloy particles according to the present invention, with a binder resin, and shaping the kneaded material using a known molding method such as an injection molding method, an extrusion molding method, a compression molding method, a calender roll molding method or the like.

Various binder resins may be selectively used according to the molding method. For example, in the case of the injection molding method, the extrusion molding method or the calender roll molding method, as the binder resins, thermoplastic resins may be suitably used. On the other hand, in the case of the compression molding method, thermosetting resins may be suitably used.

As the thermoplastic resins, there may be exemplified nylon (PA)-based resins, polypropylene (PP)-based resins, ethylene vinyl acetate (EVA)-based resins, polyphenylene sulfide (PPS)-based resins, liquid crystal polymer, (LCP)-based resins, elastomers, rubbers or the like. As the thermosetting resins, there may be exemplified epoxy-based resins, phenol-based resins or the like.

The mixing percentage of the lamellar rare earth-iron-boron-based magnet alloy particles in the bonded magnet is usually 85 to 99 wt %. The optimum mixing percentage slightly varies depending upon the molding method, but is preferably 88 to 93 wt % in injection molding, 85 to 92 wt % in extrusion molding, 96 to 99 wt % in compression molding, and 85 to 90 wt % in calender roll molding. When the mixing ratio is less than 85 wt %, the amount of the magnet alloy particles in the bonded magnet is too small, so that the obtained bonded magnet may not have sufficient magnetic characteristics.

The each upper limit of the mixing percentage of the magnet alloy particles in each molding method is values determined in accordance with requirements such as the fluidity of a kneaded or mixed material composed of the magnet alloy particles and a moldable binder resin, and the mechanical strength of the molded product.

Known additives such as plasticizer, lubricant and coupling agent may be added, if necessary, in addition to the binder resin in order to facilitate the molding and sufficiently draw out the magnetic characteristics upon the production of the bonded magnet.

These additives are appropriately selected depending upon the aimed applications. As a plasticizer, a commercially available one is usable in accordance with the resin used. The total amount of plasticizers used is usually about 0.01 to 5.0 wt % based on the weight of the binder resin used.

Examples of the lubricants may include stearic acid or derivatives thereof, inorganic lubricants, oil lubricants or the like. The amount of the lubricant used is usually about 0.01 to 1.0 wt % based on the weight of the bonded magnet.

As the coupling agents, commercially available ones are usable in accordance with a resin used and a filler. The amount of the coupling agent used is usually about 0.01 to 3.0 wt % based on the weight of the binder resin used.

The mixing of these raw materials for the bonded magnet may be conducted using various mixers such as Henschel mixer, V-shaped mixer, naughter or the like. In addition, the kneading may be conducted using a single-screw kneader, a twin-screw kneader, a mortar-type kneader, an extrusion kneader or the like.

The bonded magnet according to the present invention can be produced by magnetizing the obtained molded product by an ordinary method using an electromagnet or a pulse current magnetizer.

The reason why the obtained lamellar rare earth-iron-boron magnet alloy particles according to the present invention can exhibit such a high intrinsic coercive force (iHc), is considered to be that the synergism of Co element and the specific M element produces an effect of enhancing the magnetic anisotropy of the $Nd_2Fe_{14}B_1$ type tetragonal crystals and the effect of making the crystallized grains finer from the fact that it is impossible to produce the rare earth-iron-boron magnet alloy particles as an objective of the present invention in any of the cases where the alloy contains only Co element without the specific M element, where the alloy contains only the specific M element without Co element, and where the total sum of the Co element and the M element is out of the specified range, as will be shown in later-described comparative examples.

The reason why the obtained lamellar rare earth-iron-boron magnet alloy particles can show an excellent rust preventability, is considered to be that the amorphous phase surrounds the soft magnetic crystalline phase and the hard magnetic crystalline phase, which mainly play a magnetic role, and that the appropriate amount of amorphous phase is stable.

The lamellar rare earth-iron-boron-based magnet alloy particles according to the present invention can impart a good corrosion resistance and a good weather resistance, and can exhibit an excellent rust preventability, because the lamellar shape thereof can induce a good leafing phenomenon (effect), i.e., an effect of forming a continuous coating film of the particles which are oriented in parallel, thereby forming the whole coating surface without any slits.

Also, since the lamellar rare earth-iron-boron-based magnet alloy particles according to the present invention can show an excellent leafing effect, the magnet alloy particles can show a high packing density upon the production of bonded magnets, so that it becomes possible to produce a bonded magnet having a high residual magnetic flux density.

Thus, the lamellar rare earth-iron-boron-based magnet alloy particles according to the present invention have a high residual magnetic flux density (Br), a large intrinsic coercive force (iHc), and a large maximum energy product ($(BH)_{max}$), and exhibit an excellent rust preventability and an excellent leafing effect. It is, therefore, suitable as a material for a high-performance bonded magnet.

Since the lamellar rare earth-iron-boron-based magnet alloy particles according to the present invention contain a rare earth element in an amount as small as less than 10 atm %, the particles are advantageously produced from the viewpoints of economy and industrial applications.

In addition, the bonded magnet produced from the lamellar rare earth-iron-boron-based magnet alloy particles according to the present invention has a high residual magnetic flux density (Br) a large intrinsic coercive force (iHc) and a large maximum energy product ((BH)max), and exhibits an excellent corrosion resistance, due to the above-described properties of the lamellar rare earth-iron-boron-based magnet alloy particles. In consequence, the bonded magnet can be reduced in size and is, therefore, usable in various application fields.

EXAMPLES

The present invention will be explained in more detail hereinunder with reference to the following examples and comparative examples.

The properties in the examples and comparative examples were measured by the following methods.

(1) The particle shape of lamellar rare earth-iron-boron-based magnet alloy particles was determined by observing an appearance thereof by an electron microscope.

(2) The average major axial diameter, the average minor axial diameter and the average thickness of the particles are calculated from values measured on an enlarged micrograph (×100) of the particles.

(3) The phase structure of an alloy composition constituting the rare earth-iron-boron-based magnet alloy particles was observed and measured by a high resolution transmission electron microscope HR-TEM (manufactured by Japan Electron Optics Laboratory Co., Ltd.), a nanobeam electron diffractometer (manufactured by Japan Electron Optics Laboratory Co., Ltd.), an energy dispersive X-ray analyzer EDX (manufactured by Japan Electron Optics Laboratory Co., Ltd.) and an X-ray diffractometer (manufactured by Rigaku Denki Kogyo Co., Ltd.; target: Fe).

(4) As to the magnetic structure of the alloy composition, the crystal phase of the alloy composition constituting the rare earth-iron-boron-based magnet alloy as $\alpha Fe$ type crystal and $Fe_3B$ type crystal were identified by the electron beam analysis using the above-mentioned nanobeam electron diffractometer, and such the crystal phase was confirmed to be soft magnetic.

Similarly, the crystal phase thereof was identified as $Nd_2Fe_{14}B_1$ type crystals and such crystal phase was confirmed to be hard magnetic.

(5) The area % of the alloy composition is represented by the percentage of the existence thereof in a two-dimensional observation field of a transmission electron microscope (TEM), etc.

(6) The chemical composition of the rare earth-iron-boron-based magnet alloy particles is expressed by the values obtained by chemical analysis.

(7) The magnetic characteristics of the rare earth-iron-boron-based magnet alloy particles are expressed by the values measured by Vibration sample magnetometer VSM (manufactured by Riken Denshi Co., Ltd.).

In addition, the magnetic characteristics of a bond magnet are expressed by the values measured by a B-H curve tracer (manufactured by Toei Kogyo, Co., Ltd.) after magnetizing the bonded magnet by pulse magnetization of about 50 kOe.

(8) The rust preventability of the magnet alloy particles was determined by a salt spray test according to JIS Z 2371. The magnet alloy particles tested were taken out every predetermined period of time to examine whether or not rust was generated and the state in which rusty points increased and the rust expanded, by a scanning electron microscope (SEM). The value is the passage of time until the rust generated occupies 10 area % based on the area of the total alloy structure.

(9) The corrosion resistance of a bonded magnet was evaluated by the passage of time until the rust generated at 80° C. and a relative humidity of 90%, and the state in which rusty points increased and the rust expanded. The corrosion resistance is expressed by the passage of time until the rust generated occupies 10 area % based on the area of the total alloy structure when observed in an optical microscope field of ×50 magnification.

(10) The density (g/cm$^3$) of bonded magnet was measured as follows.

The columnar compression-molded bonded magnet produced by curing the heat-treated green compact, was sufficiently cooled to room temperature (about 25° C.). Thereafter, the obtained columnar compression-molded bonded magnet was measured with respect to the height thereof and the diameter in cross-section thereof at three or more positions thereof by using a micrometer. A volume of the columnar compression-molded bonded magnet was calculated from the average of the measured values. Further, a weight of the columnar compression-molded bonded magnet was measured by an electronic balance. The density of the columnar compression-molded bonded magnet was calculated from the thus-obtained volume and weight values.

(11) The Curie point of rare earth-iron-boron-based magnet alloy particles was measured as follows.

A quartz sample support bar equipped with a thermocouple, a casing capable of maintaining sample particles in a vacuum atmosphere, and a heater were set to a vibration sample magnetometer "VSM" (manufactured by Toei Kogyo Co., Ltd.). The sample particles were placed in the thus-assembled apparatus, and measured with respect to change in magnetization thereof depending upon temperature. More specifically, the sample particles were magnetized by applying an external magnetic field of 10 kOe thereto. Thereafter, while applying a magnetic field of 1 kOe to the particles, the temperature was increased to record values of the magnetization of the particles. The temperature at which magnetization curves of hard and soft phases were apparently intersected with each other, was determined as the curie point of the particles.

Example 1

Figure 1:
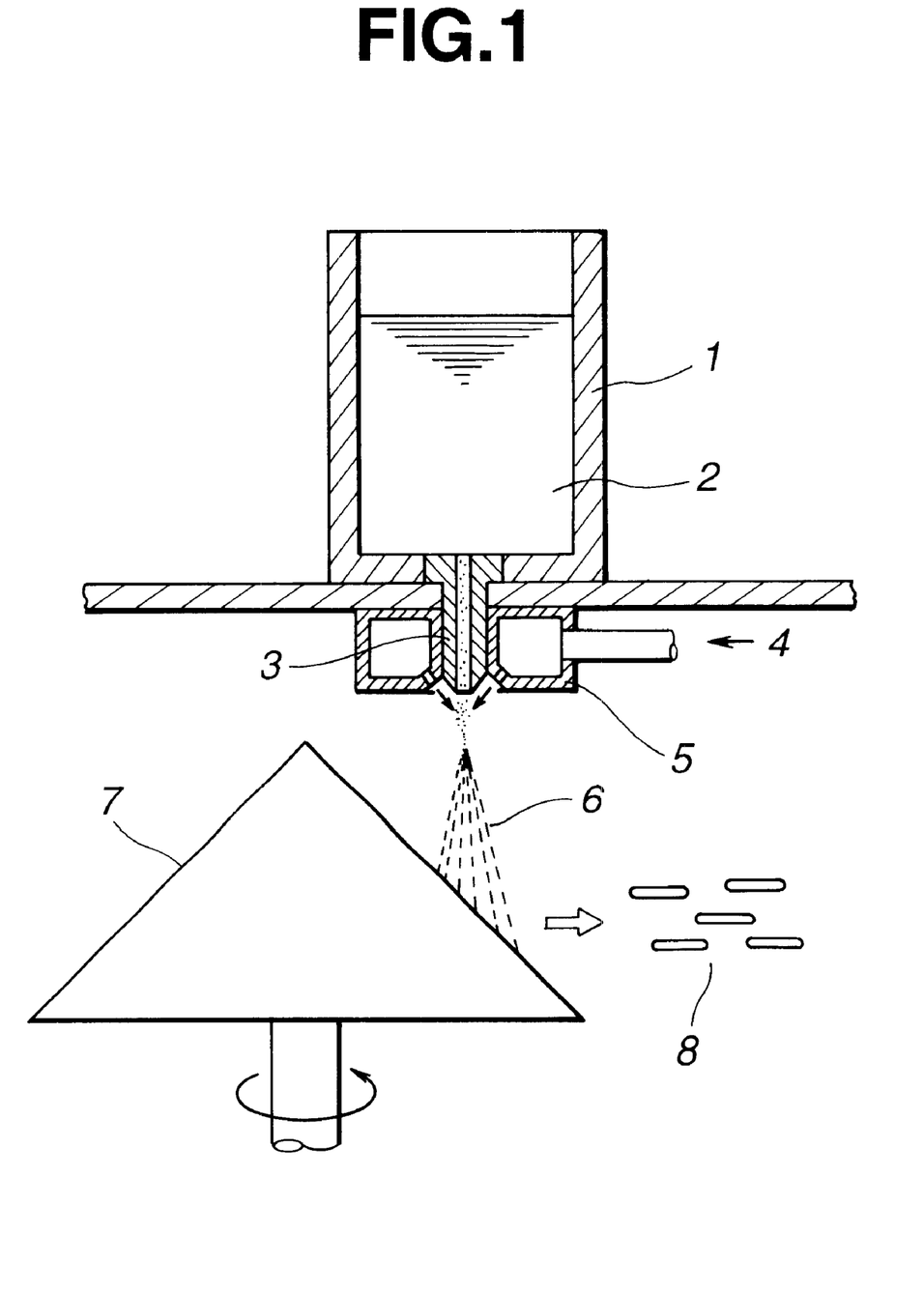
FIG. 1 is a schematic view showing an apparatus for producing lamellar rare earth-iron-boron-based magnet alloy particles obtained in Example 1 according to the present invention.

In the following, the production of rare earth-iron-boron-based magnet alloy particles is explained by referring to FIG. 1.

169.2 g of a neodymium metal piece (purity: 99.9%, produced by Nippon Yttrium Co., Ltd.), 766.6 g of an iron metal piece (electrolytic iron, purity: 99.9%, produced by Showa Denko Co., Ltd.), 38.76 g of a cobalt metal piece (purity: 99.9%, produced by Sumitomo Metal Mining Co., Ltd.), 15.24 g of a niobium metal piece, 5.73 g of a gallium metal piece and 7.13 g of a crystal boron piece were respectively weighed and mixed together (the total weight was 1 kg), so that the obtained mixture had a composition of $Nd_7Fe_{83.5}Co_4Nb_1Ga_{0.5}B_4$. The mixture was melted by a high frequency heating in an argon gas atmosphere under a reduced pressure, and then cast to obtain 1 kg of a raw alloy.

1 kg of the thus obtained raw alloy was placed in an aluminum crucible 1 and melted at 1,350° C. by high-frequency induction heating, thereby producing a molten alloy 2. The molten alloy 2 was dropped from an aluminum nozzle 3, and sprayed with an argon gas 4 which was blown through an atomizing nozzle 5 at a pressure of 20 kg/cm$^2$, thereby forming droplets 6 of the molten alloy. The droplets 6 of the molten alloy were caused to collide against a copper cone-shaped rotary cooling member 7 (roll diameter: 200 mmφ, cone angle: 120°, rotational speed: 7,200 rpm) disposed in the falling direction of the droplets as shown in FIG. 1, thereby obtaining quenched and solidified particles 8.

The obtained, quenched and solidified particles 8 had an average major axial diameter of 250 μm, an average minor axial diameter of 150 μm, an average thickness of 15 μm, an average axis ratio (major axial diameter/minor axial diameter) of 1.7:1 and an average aspect ratio (major axial diameter/thickness) of 17:1.

Figure 2:
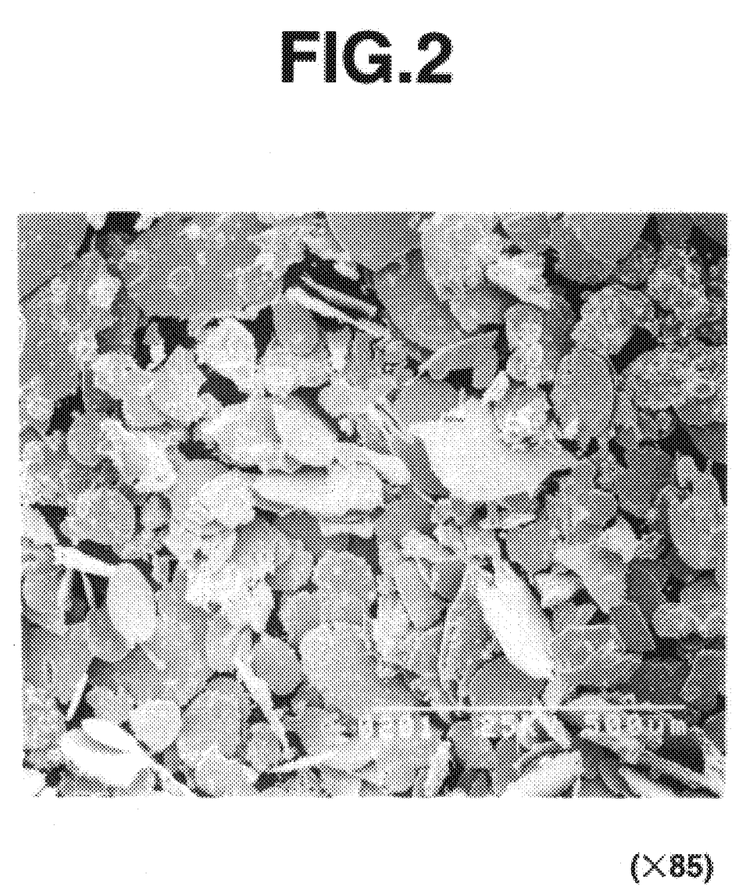
FIG. 2 is a scanning electron micrograph (magnification: ×85) showing a shape of the lamellar rare earth-iron-boron-based magnet alloy particle obtained in Example 1 according to the present invention.

The quenched and solidified particles were observed by a scanning electron microscope and were determined to be lamellar particles, as recognized from a scanning electron micrograph (magnification: ×85) shown in FIG. 2.

As a result of analyzing the obtained, quenched and solidified particles by an X-ray diffraction method, a broad peak was observed as a whole. From the results of the X-ray analysis and the observation by a high resolution transmission electron microscope, it was confirmed that at least a large portion of the quenched and solidified particles was constituted of an amorphous phase. When the constitutional elements of the quenched and solidified particles was measured by chemical analysis, the composition was confirmed to be $Nd_7Fe_{83.5}Co_4Nb_1Ga_{0.5}B_4$, which was substantially equal to the composition ratio of the starting material.

Figure 3:
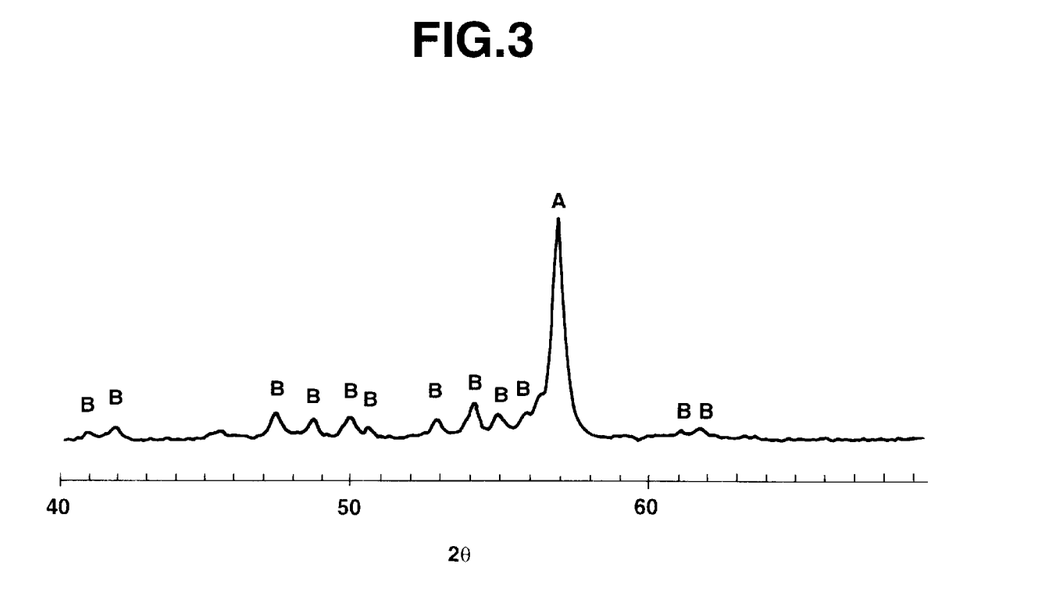
FIG. 3 is an X-ray diffraction pattern showing a crystal structure of the lamellar rare earth-iron-boron-based magnet alloy particle obtained in Example 1 according to the present invention.
Figure 4:
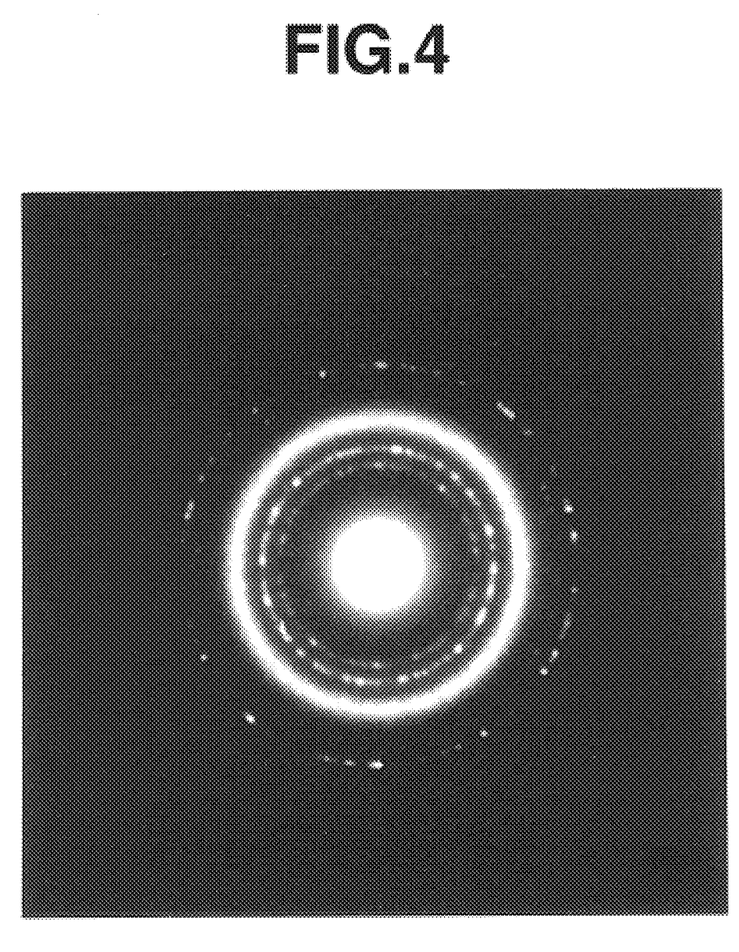
FIG. 4 is an electron diffraction pattern showing a crystal structure of the lamellar rare earth-iron-boron-based magnet alloy particle obtained in Example 1 according to the present invention.

The quenched and solidified particles were enclosed in a quartz tube under a vacuum of $5\times10^{-2}$ Torr and heat-treated at 750° C. for 3 minutes. When the rare earth-iron-boron-based alloy particles after the heat-treatment were measured by an X-ray diffraction method. As a result of analyzing the X-ray diffraction pattern of the particles as shown in FIG. 3, two kinds of distinct peaks based on an αFe type crystal structure (peak marked by "A") and an $Nd_2Fe_{14}B_1$ type crystal structure (peak marked by "B") were detected. Further, from an electron diffraction pattern as shown in FIG. 4, a spot indicating the crystallization and a halo indicating the existence of an amorphous phase were detected, whereby it was assumed that the amorphous phase remained to some extent.

The fine structure of the rare earth-iron-boron-based alloy particles after the heat-treatment was observed by the high resolution transmission electron microscope, the nanobeam electron diffractometer and the energy dispersive X-ray analyzer. In the alloy structure, the content of the soft magnetic crystalline phase containing αFe type crystals was about 72 area % based on the area of the total crystalline structure, and the content of the hard magnetic crystalline phase containing $Nd_2Fe_{14}B_1$ type crystals was about 28 area % based on the area of the total crystalline structure. The sum of these crystalline phases was 91 area % based on the area of the total alloy structure when it is assumed that the entire two-dimensional observation field is 100 area %. Consequently, the residual 9 area % based on the area of the total alloy structure was equivalent to the soft magnetic amorphous phase.

The crystal grain diameter in the soft magnetic crystalline phase containing αFe or a solid solution thereof was 20 to 45 nm, and the crystal grain diameter in the hard magnetic crystalline phase containing $Nd_2Fe_{14}B_1$ type crystals was 15 to 40 nm. Thus, it was observed that the heat-treatment accelerates the precipitation of each phase from a mixed phase of crystalline and amorphous phases before heat-treatment, and that the crystal growth thereof was caused. It was also confirmed from the results of analysis that 11.3 atm % of Nd and 7.8 atm % of B existed in the residual amorphous phase in the concentrated state.

When the magnetic characteristics of the rare earth-iron-boron-based alloy particles after the heat-treatment were measured at room temperature by the vibration sample magnetometer, the intrinsic coercive force (iHc) was 4.7 kOe, the residual magnetic flux density (Br) was 11.2 kG and the maximum energy product $((BH)_{max})$ was 17.4 MGOe.

The above-obtained rare earth-iron-boron-based magnet alloy particles were subjected to salt spray test for examining the rust preventability thereof. The rare earth-iron-boron-based magnet alloy particles were taken out every 12 hours and the area percentage of the red rust on the surface of the rare earth-iron-boron-based magnet alloy particles was measured by a scanning electron microscope. As a result, since the passage of time until the rust generated occupied 10 area % based on the area of the total surface area was 72 hours, it was determined that the rare earth-iron-boron-based magnet alloy particles also had an excellent rust preventability.

Example 2

98 g of the rare earth-iron-boron-based magnet alloy particles obtained in Example 1 and 2 g of an epoxy resin XW-2214 (trade name, produced by Nippon Perknocks Co., Ltd.) which were dissolved in an appropriate amount of methyl ethyl ketone, were well mixed. Methyl ethyl ketone was then dried and vaporized, and the obtained mixture (containing 98 wt % of the magnet alloy particles and 2 wt % of the epoxy resin) obtained was used as a material for compression molding.

3.3 g of the obtained mixture was charged into a columnar sample press jig having a diameter of 10 mm, and pressed under a pressure of about 7 ton/cm$^2$ to obtain a columnar green compact having a diameter of 10 mm and a length of about 7 mm.

The green compact was heat-treated at 150° C. for one hour to cure the epoxy resin, thereby producing a compression-molded bonded magnet having a density of 6.3 g/cm$^3$.

After the obtained compression-molded bonded magnet was magnetized by a pulse magnetizer which have a magnetizing force of about 50 kOe, the magnetic characteristics at room temperature was measured by the B-H curve tracer. The residual magnetic flux density (Br) was 9.1 kG, the intrinsic coercive force (iHc) was 4.6 kOe and the maximum energy product ((BH)max) was 10.5 MGOe.

The bonded magnet was subjected to a corrosion test at 80° C. and a relative humidity of 90%, and the state of generating rust with the time elapsed was observed. As a result of the observation by an optic microscope (magnification: ×50) every 12 hours, rust having a size of 0.1 mm at most were first detected at several points in the observation field after 72 hours. The observation was further continued every 12 hours in the same observation filed. Even after 168 hours elapsed, the rust occupied only 10 area % in the observation field. It was thus determined that the bonded magnet also had an excellent corrosion resistance.

<Production of Rare-iron-boron-based Magnet Alloy Particles>

Examples 3 to 29

Rare earth magnet alloy particles were produced in the same way as defined in Example 1 except for varying the composition of alloy produced, and the rotational speed of the rotary cooling member, the pressure of the argon gas sprayed and the temperature upon the subsequent heat-treatment in the production of the alloy particles.

The phase structure of each of the rare earth magnet alloy particles obtained in Examples 3 to 29 was observed in the same way as defined in Example 1.

As a result, it was confirmed that the content of the soft magnetic crystalline phase containing αFe type crystals was 18 to 75 area % based on the area of the total crystalline structure, and the content of the hard magnetic crystalline phase containing $Nd_2Fe_{14}B_1$ type crystals was 25 to 82 area % based on the area of the total crystalline structure. The sum of these crystalline phases was 90 to 99 area % based on the area of the total alloy structure when it is assumed that the entire two-dimensional observation field was 100 area %. Consequently, the residual 1 to 10 area % was equivalent to the soft magnetic amorphous phase.

The crystal grain diameter in the soft magnetic crystalline phase comprising either αFe, a solid solution composed of αFe and M, or a mixed phase composed of αFe and the solid solution, was 5 to 100 nm, and the crystal grain diameter in the hard magnetic crystalline phase composed of $Nd_2Fe_{14}B_1$ type tetragonal crystals was 5 to 100 nm. Thus, it was observed that each phase was crystallized and crystallized by the heat-treatment from the amorphous phase. It was also confirmed from the result of analysis that 10 to 15 atm % of rare earth elements and 7 to 9 atm % of B existed in the residual amorphous phase in the concentrated state.

Reference Example 1

<Single Roll-type Liquid Quenching Method Described in "Story of Amorphous Metals" Published by Japan Industrial Standards Institute, (1988), pp. 36–37>

The same procedure as defined in Example 1 was conducted except that the alloy composition was changed to that used in Example 22, thereby producing a molten alloy.

The thus-obtained molten alloy was discharged through a nozzle, thereby forming a ribbon-shaped flux material of the molten alloy. Before the ribbon-shaped flux material of the molten alloy was solidified, the ribbon-shaped flux material was caused to contact with a peripheral surface of a roll-type rotary cooling member disposed so that the rotation axis of the member is orthogonal to the flowing direction of the molten alloy, thereby obtaining thin ribbon-shaped quenched and solidified material.

The obtained quenched and solidified material had a thin-ribbon shape having a thickness of 30 to 50 μm. The thin ribbon-shaped material was mechanically pulverized and then passed through a sieve, thereby obtaining particles having a particle size of not more than 500 μm.

As a result of the observation by an electron microscope, the obtained particles were determined to be rubble-like particles. Production conditions and various properties of the rubble-like particles are shown in Tables 2 and 4, and various properties of a bonded magnet produced from the rubble-like particles, are shown in Table 5.

Reference Example 2

The same procedure as defined in Example 1 was conducted except that the alloy composition was changed to that used in Example 22 and no gas was sprayed onto the molten alloy discharged, thereby producing quenched and solidified particles.

As a result of the observation, the obtained quenched and solidified particles were determined to be wavelike-curved plate-like particles having an uneven thickness fluctuating in a wide range between about 100 μm and about 1 mm. The obtained quenched and solidified particles were mechanically pulverized and then passed through a sieve, thereby obtaining particles having a particle size of not more than 500 μm.

Production conditions and various properties of the wavelike-curved plate-like particles are shown in Tables 2 and 4, and various properties of a bonded magnet produced from the particles, are shown in Table 5.

Reference Example 3

<Gas-atomizing Method Described in "Handbook of Metals" Published by Maruzen, (1990), pp. 932–933>

The same procedure as defined in Example 1 was conducted except that the alloy composition was changed to that used in Example 22, thereby producing a molten alloy.

The thus-obtained molten alloy was discharged through a nozzle and sprayed with gas, thereby forming droplets of the molten alloy. The droplets of the molten alloy were allowed to fly in a chamber which was large enough to be the flying droplets free from any collision, until the droplets were quenched and solidified while maintaining a spherical shape thereof and then dropped by gravity.

The obtained quenched and solidified particles are spherical particles having such a wide particle size distribution that the diameter thereof varies from several μm to several hundred μm.

As a result of the observation by an electron microscope, the obtained particles were determined to be spherical particles. Production conditions and various properties of the obtained spherical particles are shown in Tables 2 and 4, and various properties of a bonded magnet produced from the spherical particles, are shown in Table 5.

Example 30 to 56, Reference Examples 4 to 6

Bonded magnets were produced in the same way as defined in Example 2 except for varying the kind of magnet alloy particles used.

The main production conditions and various properties are shown in Table 5.

It is obvious that the bonded magnets according to the present invention are more excellent in the magnetic characteristics and the corrosion resistance than those in Comparative Examples.

TABLE 1

| Examples | Production conditions of rare earth magnet alloy particles Composition of alloy produced |
|---|---|
| Ex.3  | $Nd_7 Fe_{82} Co_6 Ti_1 B4$ |
| Ex.4  | $Nd_7 Fe_{83} Co_5 V_1 B_4$ |
| Ex.5  | $Nd_7 Fe_{83} Co_{2.5} Cr_{3.5} B_4$ |
| Ex.6  | $Nd_7 Fe_{83.5} Co_2 Mn_{3.5} B_4$ |
| Ex.7  | $Nd_7 Fe_{81.5} Co_7 Cu_{0.5} B_4$ |
| Ex.8  | $Nd_7 Fe_{83.5} Co_3 Ga_{2.5} B_4$ |
| Ex.9  | $Nd_7 Fe_{82} Co_{6.5} Zr_{0.5} B_4$ |
| Ex.10 | $Nd_7 Fe_{83.5} Co_{4.5} Nb_1 B_4$ |
| Ex.11 | $Nd_7 Fe_{83.5} Co_{3.5} Mo_2 B_4$ |
| Ex.12 | $Nd_7 Fe_{80} Co_{8.7} Hf_{0.3} B_4$ |
| Ex.13 | $Nd_7 Fe_{83} Co_5 Ta_1 B_4$ |
| Ex.14 | $Nd_6 Pr_1 Fe_{83} Co_4 W_2 B_4$ |
| Ex.15 | $Nd_5 Pr_2 Fe_{82} Co_{5.5} Si_{1.5} B_4$ |
| Ex.16 | $Nd_6 Fe_{82} Co_4 Nb_1 V_1 B_6$ |
| Ex.17 | $Nd_7 Fe_{82.5} Co_4 Nb_1 Cu_{0.5} B_5$ |
| Ex.18 | $Nd_8 Fe_{82} Co_4 Cr_2 Mn_1 B_3$ |
| Ex.19 | $Nd_6 Pr_1 Fe_{83.5} Co_4 Ti_1 Ga_{0.5} B_4$ |
| Ex.20 | $Nd_5 Pr_3 Fe_{82} Co_4 Ta_1 Si_1 B_4$ |
| Ex.21 | $Nd_5 Pr_3 Fe_{76} Co_8 Nb_{1.5} B_{6.5}$ |
| Ex.22 | $Nd_7 Fe_{82.5} Co_4 Nb_1 Cu_{0.5} B_5$ |
| Ex.23 | $Nd_7 Fe_{82.5} Co_4 Nb_1 Cu_{0.5} B_5$ |
| Ex.24 | $Nd_8 Fe_{80.5} Co_4 Nb_1 B_{6.5}$ |
| Ex.25 | $Nd_8 Fe_{80} Co_4 Nb_{1.5} B_{6.5}$ |
| Ex.26 | $Nd_8 Fe_{79.5} Co_4 Nb_2 B_{6.5}$ |
| Ex.27 | $Nd_8 Fe_{79} Co_4 Nb_{2.5} B_{6.5}$ |
| Ex.28 | $Nd_{8.5} Fe_{79.5} Co_4 Nb_1 B_7$ |
| Ex.29 | $Nd_9 Fe_{79} Co_4 Nb_1 B_7$ |

TABLE 1-continued

| | Production conditions of rare earth magnet alloy particles | | | |
|---|---|---|---|---|
| | Rotary cooling member | | Pressure of argon | Heat- |
| Examples | Shape | Rotational speed (rpm) | gas sprayed (kgf/cm²) | treatment temperature (° C.) |
| Ex.3  | Cone-shaped | 7,200  | 20 | 700 |
| Ex.4  | Cone-shaped | 7,200  | 20 | 700 |
| Ex.5  | Cone-shaped | 7,200  | 20 | 680 |
| Ex.6  | Cone-shaped | 7,200  | 20 | 680 |
| Ex.7  | Cone-shaped | 7,200  | 20 | 680 |
| Ex.8  | Cone-shaped | 7,200  | 20 | 700 |
| Ex.9  | Cone-shaped | 7,200  | 20 | 720 |
| Ex.10 | Cone-shaped | 7,200  | 20 | 720 |
| Ex.11 | Cone-shaped | 7,200  | 20 | 700 |
| Ex.12 | Cone-shaped | 7,200  | 20 | 740 |
| Ex.13 | Cone-shaped | 7,200  | 20 | 740 |
| Ex.14 | Cone-shaped | 7,200  | 20 | 720 |
| Ex.15 | Cone-shaped | 7,200  | 20 | 700 |
| Ex.16 | Cone-shaped | 7,200  | 20 | 760 |
| Ex.17 | Cone-shaped | 7,200  | 20 | 780 |
| Ex.18 | Cone-shaped | 7,200  | 20 | 720 |
| Ex.19 | Cone-shaped | 7,200  | 20 | 700 |
| Ex.20 | Cone-shaped | 7,200  | 20 | 680 |
| Ex.21 | Cone-shaped | 7,200  | 20 | 720 |
| Ex.22 | Cone-shaped | 12,000 | 20 | 780 |
| Ex.23 | Cone-shaped | 1,000  | 20 | 780 |
| Ex.24 | Cone-shaped | 7,200  | 5  | 760 |
| Ex.25 | Cone-shaped | 7,200  | 10 | 760 |
| Ex.26 | Cone-shaped | 7,200  | 20 | 760 |
| Ex.27 | Cone-shaped | 7,200  | 20 | 760 |
| Ex.28 | Cone-shaped | 7,200  | 20 | 720 |
| Ex.29 | Cone-shaped | 7,200  | 20 | 720 |

TABLE 2

| Reference Examples | Production conditions of rare earth magnet alloy particles Composition of alloy produced |
|---|---|
| Ref. Ex. 1 | $Nd_7 Fe_{82.5} Co_4 Nb_1 Cu_{0.5} B_5$ |
| Ref. Ex. 2 | $Nd_7 Fe_{82.5} Co_4 Nb_1 Cu_{0.5} B_5$ |
| Ref. Ex. 3 | $Nd_7 Fe_{82.5} Co_4 Nb_1 Cu_{0.5} B_5$ |

| | Production conditions of rare earth magnet alloy particles | | | |
|---|---|---|---|---|
| | Rotary cooling member | | Pressure of argon gas | Heat-treatment |
| Reference Example | Shape | Rotational speed (rpm) | sprayed (kgf/cm²) | temperature (° C.) |
| Ref. Ex. 1 | Single roll-type liquid quenching method | | | 780 |
| Ref. Ex. 2 | Cone-shaped | 7,200 | — | 780 |
| Ref. Ex. 3 | Gas-atomizing method | | 20 | 780 |

TABLE 3

Properties of rare earth magnet alloy particles

| Examples | Particle shape | Average major axial diameter (μm) | Average minor axial diameter (μm) | Average thickness (μm) |
|---|---|---|---|---|
| Ex.3 | Lamellar | 250 | 150 | 15 |
| Ex.4 | Lamellar | 245 | 165 | 14 |
| Ex.5 | Lamellar | 255 | 165 | 15 |
| Ex.6 | Lamellar | 265 | 145 | 17 |
| Ex.7 | Lamellar | 255 | 155 | 17 |
| Ex.8 | Lamellar | 245 | 165 | 13 |
| Ex.9 | Lamellar | 265 | 185 | 19 |
| Ex.10 | Lamellar | 285 | 185 | 22 |
| Ex.11 | Lamellar | 335 | 235 | 35 |
| Ex.12 | Lamellar | 285 | 185 | 18 |
| Ex.13 | Lamellar | 295 | 185 | 25 |
| Ex.14 | Lamellar | 345 | 255 | 33 |
| Ex.15 | Lamellar | 245 | 165 | 13 |
| Ex.16 | Lamellar | 285 | 205 | 24 |
| Ex.17 | Lamellar | 285 | 185 | 22 |
| Ex.18 | Lamellar | 245 | 155 | 14 |
| Ex.19 | Lamellar | 265 | 155 | 14 |
| Ex.20 | Lamellar | 285 | 205 | 25 |
| Ex.21 | Lamellar | 315 | 205 | 28 |
| Ex.22 | Lamellar | 120 | 95 | 6 |
| Ex.23 | Lamellar | 490 | 410 | 95 |
| Ex.24 | Lamellar | 470 | 425 | 93 |
| Ex.25 | Lamellar | 429 | 354 | 80 |
| Ex.26 | Lamellar | 333 | 210 | 36 |
| Ex.27 | Lamellar | 277 | 246 | 51 |
| Ex.28 | Lamellar | 290 | 150 | 34 |
| Ex.29 | Lamellar | 325 | 158 | 49 |

Properties of rare earth magnet alloy particles

| Examples | Average axis ratio (major axial diameter/ minor axial diameter) | Average aspect ratio (major axial diameter/ thickness) | Alloy composition |
|---|---|---|---|
| Ex.3 | 1.7 | 17 | Same as Table 1 |
| Ex.4 | 1.5 | 18 | Same as Table 1 |
| Ex.5 | 1.5 | 17 | Same as Table 1 |
| Ex.6 | 1.8 | 16 | Same as Table 1 |
| Ex.7 | 1.6 | 15 | Same as Table 1 |
| Ex.8 | 1.5 | 19 | Same as Table 1 |
| Ex.9 | 1.4 | 14 | Same as Table 1 |
| Ex.10 | 1.5 | 13 | Same as Table 1 |
| Ex.11 | 1.4 | 10 | Same as Table 1 |
| Ex.12 | 1.5 | 16 | Same as Table 1 |
| Ex.13 | 1.6 | 12 | Same as Table 1 |
| Ex.14 | 1.4 | 10 | Same as Table 1 |
| Ex.15 | 1.5 | 19 | Same as Table 1 |
| Ex.16 | 1.4 | 12 | Same as Table 1 |
| Ex.17 | 1.5 | 13 | Same as Table 1 |
| Ex.18 | 1.6 | 18 | Same as Table 1 |
| Ex.19 | 1.7 | 19 | Same as Table 1 |
| Ex.20 | 1.4 | 11 | Same as Table 1 |
| Ex.21 | 1.5 | 11 | Same as Table 1 |
| Ex.22 | 1.3 | 20 | Same as Table 1 |
| Ex.23 | 1.2 | 5 | Same as Table 1 |
| Ex.24 | 1.1 | 5.1 | Same as Table 1 |
| Ex.25 | 1.2 | 5.4 | Same as Table 1 |
| Ex.26 | 1.6 | 9.3 | Same as Table 1 |
| Ex.27 | 1.1 | 5.4 | Same as Table 1 |
| Ex.28 | 1.9 | 8.5 | Same as Table 1 |
| Ex.29 | 2.1 | 6.6 | Same as Table 1 |

TABLE 3-continued

Properties of rare earth magnet alloy particles
Crystalline phase in alloy structure (c + d = 100%)

| Examples | Crystalline phase (a + b = 100%) Soft magnetic crystal-line phase a (area %) | hard magnetic crystal-line phase b (area %) | Total crystal-line phase c (area %) | Soft magnetic amorphous phase d (area %) |
|---|---|---|---|---|
| Ex.3 | 72 | 28 | 91 | 9 |
| Ex.4 | 74 | 26 | 94 | 6 |
| Ex.5 | 75 | 25 | 95 | 5 |
| Ex.6 | 72 | 28 | 94 | 6 |
| Ex.7 | 74 | 26 | 94 | 6 |
| Ex.8 | 75 | 25 | 92 | 8 |
| Ex.9 | 70 | 30 | 90 | 10 |
| Ex.10 | 72 | 28 | 90 | 10 |
| Ex.11 | 75 | 25 | 92 | 8 |
| Ex.12 | 70 | 30 | 90 | 10 |
| Ex.13 | 74 | 26 | 91 | 9 |
| Ex.14 | 70 | 30 | 91 | 9 |
| Ex.15 | 71 | 29 | 94 | 6 |
| Ex.16 | 70 | 30 | 90 | 10 |
| Ex.17 | 74 | 26 | 91 | 9 |
| Ex.18 | 75 | 25 | 91 | 9 |
| Ex.19 | 73 | 27 | 95 | 5 |
| Ex.20 | 74 | 26 | 91 | 9 |
| Ex.21 | 72 | 28 | 90 | 10 |
| Ex.22 | 74 | 26 | 90 | 10 |
| Ex.23 | 73 | 27 | 93 | 7 |
| Ex.24 | 69 | 31 | 94 | 6 |
| Ex.25 | 54 | 46 | 92 | 8 |
| Ex.26 | 43 | 57 | 93 | 7 |
| Ex.27 | 39 | 61 | 93 | 7 |
| Ex.28 | 21 | 79 | 96 | 4 |
| Ex.29 | 18 | 82 | 99 | 1 |

Properties of rare earth magnet alloy particles

| Ex. | Magnetic characteristics Residual magnetic flux density (Br) (kCauss) | Intrinsic coercive force (iHc) (kOe) | Maximum energy product $(BH)_{max}$ (MGOe) | Curie point (° C.) | Rust prevent-ability (Time elapsed before rust developed occupies 10 area %) (hr) |
|---|---|---|---|---|---|
| Ex.3 | 10.8 | 4.0 | 15.2 | 428 | 60 |
| Ex.4 | 11.1 | 4.8 | 16.5 | 424 | 60 |
| Ex.5 | 9.9 | 5.0 | 16.9 | 342 | 84 |
| Ex.6 | 10.8 | 4.1 | 17.1 | 367 | 72 |
| Ex.7 | 10.5 | 4.1 | 16.9 | 431 | 72 |
| Ex.8 | 10.2 | 4.2 | 15.4 | 360 | 60 |
| Ex.9 | 9.8 | 4.4 | 15.5 | 396 | 60 |
| Ex.10 | 11.7 | 4.7 | 18.4 | 428 | 60 |
| Ex.11 | 10.7 | 4.1 | 16.7 | 386 | 60 |
| Ex.12 | 10.3 | 4.2 | 15.3 | 448 | 72 |
| Ex.13 | 9.9 | 4.5 | 15.5 | 378 | 60 |
| Ex.14 | 10.8 | 4.4 | 16.3 | 397 | 60 |
| Ex.15 | 11.1 | 4.7 | 17.1 | 432 | 60 |
| Ex.16 | 11.3 | 5.1 | 18.1 | 438 | 60 |
| Ex.17 | 11.5 | 4.8 | 17.1 | 423 | 60 |
| Ex.18 | 10.3 | 4.8 | 16.7 | 379 | 72 |
| Ex.19 | 10.5 | 4.8 | 17.0 | 386 | 60 |
| Ex.20 | 10.4 | 4.9 | 17.2 | 382 | 60 |
| Ex.21 | 10.2 | 5.7 | 18.3 | 433 | 60 |
| Ex.22 | 10.3 | 3.9 | 13.5 | 430 | 84 |

TABLE 3-continued

| | | | | | |
|---|---|---|---|---|---|
| Ex.23 | 11.1 | 4.7 | 16.9 | 427 | 60 |
| Ex.24 | 10.3 | 4.7 | 13.6 | 420 | 60 |
| Ex.25 | 10.2 | 6.1 | 17.4 | 401 | 60 |
| Ex.26 | 9.9 | 6.4 | 17.7 | 387 | 60 |
| Ex.27 | 9.8 | 6.9 | 19.2 | 382 | 60 |
| Ex.28 | 10.2 | 6.4 | 19.5 | 360 | 60 |
| Ex.29 | 9.8 | 6.6 | 18.1 | 356 | 60 |

TABLE 4

Properties of rare earth magnet alloy particles

| Reference Example | Particle shape | Average major axial diameter ($\mu$m) | Average minor axial diameter ($\mu$m) | Average thickness ($\mu$m) |
|---|---|---|---|---|
| Ref. Ex. 1 | Rubble-like | — | — | — |
| Ref. Ex. 2 | Wavelike-curved plate-like | — | — | — |
| Ref. Ex. 3 | Spherical | — | — | — |

Properties of rare earth magnet alloy particles

| Reference Example | Average axis ratio (major axial diameter/minor axial diameter) | Average aspect ratio (major axial diameter/thickness) | Alloy composition |
|---|---|---|---|
| Ref. Ex. 1 | — | — | Same as Table 2 |
| Ref. Ex. 2 | — | — | Same as Table 2 |
| Ref. Ex. 3 | — | — | Same as Table 2 |

Properties of rare earth magnet alloy particles
Crystalline phase in alloy structure (c + d = 100%)

| | Crystalline phase (a + b = 100%) | | | |
|---|---|---|---|---|
| Reference Example | Soft magnetic crystalline phase a (area %) | hard magnetic crystalline phase b (area %) | Total crystalline phase c (area %) | Soft magnetic amorphous phase d (area %) |
| Ref. Ex. 1 | 72 | 28 | 91 | 9 |
| Ref. Ex. 2 | 73 | 27 | 92 | 8 |
| Ref. Ex. 3 | 73 | 27 | 92 | 8 |

TABLE 4-continued

Properties of rare earth magnet alloy particles

| | Magnetic characteristics | | | | Rust preventability |
|---|---|---|---|---|---|
| Ref. Ex. | Residual magnetic flux density (Br) (kGauss) | Intrinsic coercive force (iHc) (kOe) | Maximum energy product $(BH)_{max}$ (MGOe) | Curie point (° C.) | (Time elapsed before rust developed occupies 10 area %) (hr) |
| Ref. Ex. 1 | 10.7 | 4.7 | 16.8 | 420 | 50 |
| Ref. Ex. 2 | 10.0 | 3.4 | 9.6 | 408 | 48 |
| Ref. Ex. 3 | 9.2 | 4.9 | 10.3 | 417 | 48 |

TABLE 5

Properties of bonded magnet

| Ex. & Ref. Ex. | Kind of magnet alloy particles used | Intrinsic coercive force (iHc) (kOe) | Residual magnetic flux density (Br) (kGauss) | Maximum energy product (BH)max (MGOe) | Density (g/cm³) | Corrosion resistance (Time elapsed before the rust developed occupies 10 area %) (Hr) |
|---|---|---|---|---|---|---|
| Ex. 30 | Ex. 3 | 3.8 | 8.1 | 9.7 | 6.3 | 145 |
| Ex. 31 | Ex. 4 | 4.7 | 8.2 | 10.6 | 6.2 | 157 |
| Ex. 32 | Ex. 5 | 4.8 | 7.9 | 10.1 | 6.3 | 180 |
| Ex. 33 | Ex. 6 | 4.0 | 8.6 | 10.5 | 6.4 | 168 |
| Ex. 34 | Ex. 7 | 3.9 | 7.9 | 10.8 | 6.2 | 178 |
| Ex. 35 | Ex. 8 | 4.1 | 8.1 | 9.5 | 6.2 | 144 |
| Ex. 36 | Ex. 9 | 4.4 | 7.2 | 9.8 | 6.4 | 148 |
| Ex. 37 | Ex. 10 | 4.5 | 9.3 | 11.3 | 6.3 | 156 |
| Ex. 38 | Ex. 11 | 3.9 | 7.9 | 10.7 | 6.2 | 148 |
| Ex. 39 | Ex. 12 | 4.2 | 7.4 | 9.7 | 6.3 | 180 |
| Ex. 40 | Ex. 13 | 4.3 | 7.2 | 9.9 | 6.3 | 146 |
| Ex. 41 | Ex. 14 | 4.3 | 7.9 | 10.4 | 6.4 | 146 |
| Ex. 42 | Ex. 15 | 4.5 | 8.2 | 11.0 | 6.2 | 145 |
| Ex. 43 | Ex. 16 | 4.9 | 9.0 | 11.4 | 6.5 | 168 |
| Ex. 44 | Ex. 17 | 4.4 | 8.5 | 11.0 | 6.4 | 153 |
| Ex. 45 | Ex. 18 | 4.7 | 8.0 | 10.7 | 6.2 | 173 |
| Ex. 46 | Ex. 19 | 4.5 | 8.4 | 10.1 | 6.2 | 132 |
| Ex. 47 | Ex. 20 | 4.8 | 8.0 | 11.0 | 6.3 | 136 |
| Ex. 48 | Ex. 21 | 5.2 | 7.5 | 11.8 | 6.3 | 139 |
| Ex. 49 | Ex. 22 | 3.7 | 7.7 | 9.6 | 6.4 | 212 |
| Ex. 50 | Ex. 23 | 4.6 | 8.4 | 10.8 | 6.3 | 138 |
| Ex. 51 | Ex. 24 | 4.5 | 7.8 | 9.6 | 6.3 | 136 |
| Ex. 52 | Ex. 25 | 5.7 | 7.4 | 11.2 | 6.3 | 135 |
| Ex. 53 | Ex. 26 | 6.0 | 7.4 | 11.3 | 6.3 | 147 |
| Ex. 54 | Ex. 27 | 6.4 | 7.2 | 12.4 | 6.3 | 140 |
| Ex. 55 | Ex. 28 | 6.4 | 7.9 | 12.5 | 6.2 | 135 |
| Ex. 56 | Ex. 29 | 6.1 | 7.7 | 11.6 | 6.3 | 138 |
| Ref. Ex. 4 | Ref. Ex. 1 | 4.5 | 7.1 | 9.3 | 6.0 | 90 |
| Ref. Ex. 5 | Ref. Ex. 2 | 3.1 | 6.6 | 5.6 | 5.7 | 78 |
| Ref. Ex. 6 | Ref. Ex. 3 | 4.3 | 5.9 | 7.9 | 5.9 | 66 |

What is claimed is:
1. Lamellar rare earth-iron-boron-based magnet alloy particles having a composition represented by the formula:

$R_xFe_{(100-x-y-z-w)}Co_yM_zB_w$ wherein R is at least one rare earth element selected from the group consisting of Nd, Pr, Dy, Tb and Ce, M is at least one element selected from the group consisting of Ti, V, Cr, Zr, Nb, Mo, Hf, Ta, W, Mn, Cu, Ga, Ag and Si, x is 5 to 9, y is 1.0 to 9.0, z is 0.1 to 5, w is 2 to 7, (x+w) is not less than 9, and (y+z) is more than 5, said particles having an intrinsic coercive force (iHc) of not less than 3.5 kOe, a residual magnetic flux density (Br) of not less than 9.5 kG, and a maximum energy product ($(BH)_{max}$) of not less than 13 MGOe, and having an average major axial diameter of 60 to 500 μm, an average minor axial diameter of 50 to 460 μm, an average axis ratio (major axial diameter/minor axial diameter) of 1.1 to 10 and an average aspect ratio (major axial diameter/thickness) of 3 to 100.

2. Lamellar rare earth-iron-boron-based magnet alloy particles according to claim 1, which further comprises:

an alloy structure in which a soft magnetic crystalline phase comprising either αFe, a solid solution composed of αFe and M, or a mixed phase composed of αFe and a solid solution composed of αFe and M, and a hard magnetic crystalline phase comprising $Nd_2Fe_{14}B_1$ tetragonal crystals are crystallized in a soft magnetic amorphous phase, the content of said soft magnetic amorphous phase being 1 to 10 area % based on the area of the total alloy structure, and the content of said soft magnetic crystalline phase being 10 to 90 area % based on the area of the total crystalline structure comprising the soft magnetic crystalline phase and the hard magnetic crystalline phase.

3. Lamellar rare earth-iron-boron-based magnet alloy particles according to claim 2, wherein the crystal grain diameter in said soft magnetic crystalline phase is 5 to 100 nm.

4. Lamellar rare earth-iron-boron-based magnet alloy particles according to claim 2, wherein the crystal grain diameter in said hard magnetic crystalline phase is 5 to 100 nm.

5. A bonded magnet comprising 85 to 99% by weight of said lamellar rare earth-iron-boron-based magnet alloy particles as defined in claim 1 or 2 and a binder resin in which said lamellar rare earth-iron-boron-based magnet alloy particles are dispersed.

6. A bonded magnet according to claim 5, which further has a residual magnetic flux density (Br) of not less than 7.2 kG, an intrinsic coercive force (iHc) of not less than 3.5 kOe and a maximum energy product $(BH)_{max}$ of not less than 9.5 MGOe.

7. A bonded magnet according to claim 5, which further has a density of not less than 6.1 $g/cm^3$.

8. Lamellar rare earth-iron-boron-based magnet alloy particles according to claim 2, wherein the content of said soft magnetic amorphous phase is 1 to 9 area % based on the area of the total alloy structure; the content of said soft magnetic crystalline phase 15 to 80 area % based on the area of the total crystalline structure comprising the soft magnetic crystalline phase and the hard magnetic crystalline phase; and the content of the hard magnetic crystalline phase is 20 to 85 area % based on the area of the total crystalline structure comprising the soft magnetic crystalline phase and the hard magnetic crystalline phase.

9. A process for producing the lamellar rare earth-iron-boron-based magnet alloy particles of claim 1, for a bonded magnet, comprising the steps of:

preparing a mixture having a composition of the rare earth-iron-boron-based magnet alloy particles;

heat-melting said obtained mixture to produce a molten alloy;

discharging said molten alloy through a nozzle;

spraying a gas onto said molten alloy discharged to form droplets of said molten alloy;

before solidification of said droplets, causing said droplets to collide against a cone-shaped or disc-shaped rotary cooling member which is disposed along the falling direction of said droplets to subject said droplets to quench solidification and is rotated, thereby forming quenched and solidified particles; and heat-treating said quenched and solidified particles in the temperature range of 600 to 850° C.

* * * * *